Patented Aug. 25, 1953

2,650,195

UNITED STATES PATENT OFFICE 2,650,195

METHOD OF PREVENTING LOSS OF FLUID INTO THIEF FORMATIONS

Paul H. Cardwell and Frank H. Braunlich, Jr., Tulsa, Okla., assignors to The Dow Chemical Company, Midland, Mich., a corporation of Delaware No Drawing. Application May 26, 1952, Serial No. 290,086

1 Claim. (Cl. 252—8.5)

The invention relates to methods of preventing loss of fluid from deep wells penetrating a thief formation. It more particularly concerns a method of preventing loss of drilling fluid from the bore of a deep well into a thief formation.

In drilling wells, especially those intended to reach an oil or gas-producing stratum, it is the usual practice to employ a fluid, such as a claybase mud, for suspending and removing from the well the cuttings formed by the drill. Oftentimes, it is necessary to go to great expense and inconvenience to formulate suitable drilling fluid to meet various adverse drilling conditions especially those requiring heavy muds and muds which have little or no tendency to swell clay and shale formations. The usual drilling muds are aqueous suspensions but non-aqueous drilling muds are also used, such as those compounded of crude petroleum and the like. Although the fine solids (e. g. clay particles) of the usual drilling muds tend to filter out on the face of the well bore forming a more or less fluid-impervious filter cake which retards or prevents fluid in the well from penetrating into and being wasted in the surrounding earth formations, earth strata are sometimes encountered into which the drilling mud passes in excessive amount without deposition of an adequate filter cake as when the earth formation is unusually porous or traversed by cracks or fissures the openings in which are large enough to admit the mud fluid without adequate filtration action and formation of a sealing filter cake. Earth formations having these characteristics are generally referred to as thief zones. Heretofore, many expedients have been proposed in attempts to stop the loss of drilling fluid from a well hole when a thief zone is encountered during drilling. These proposals are based upon the principle of adding to the drilling mud additional particulated material with the hope that it will be strained out of the mud fluid as it passes into the thief formation, thereby building up a deposit or filter cake of particulated material through which the drilling fluid can pass, if at all, only with difficulty. Nevertheless, it is a common experience in well drilling to lose excessive amounts of mud fluid, in spite of the addition of conventional particulated materials to the mud fluid, when thief zones are encountered. It is also observed that the filter cakes which may result from conventional particulated agents used in drilling muds are not entirely impervious to the liquids present in the mud fluids. As a result, the adjacent formations may become impregnated with unwanted fluid. Accordingly, it is an object of the invention to provide an improved method of restraining or preventing the loss of fluid from a well hole. Another object is to provide an improved method of restraining or preventing the loss of the liquid medium of mud fluids by seepage through the filter cake normally formed on the well hole wall. Other objects and advantages will become apparent from the following description of the invention.

The invention is predicated upon providing a cohesive resinous coating upon filterable inert solid particles which are added to the fluid, the loss of which is to be restrained or prevented, so as to form a filter cake of self-bonding particles when a thief zone is encountered, the resinous coating acting to bond the particles together in the cake into a monolithic structure and thereby form a fluid impervious barrier to the passage of fluid from the well hole into the surrounding formations.

In carrying out the invention, various filler materials may be used, for example coke, coal, cinders, nut shells, which are reduced to particles of suitable size, such as those having a longest dimension of $\frac{1}{8}$ to $\frac{3}{8}$ inch, although other sizes may be used. Particles are large as 0.5 inch diameter may be used in severe cases. It is preferable to use particles of severel different sizes within the aforementioned size ranges. For example, 48 to 58 per cent by weight of a batch of particles may have a maximum dimension of $\frac{3}{8}$ to $\frac{3}{16}$ inch; up to 5 per cent may be from $\frac{3}{16}$ inch to 10 mesh in size; 28–38 per cent may be between 10 and 40 mesh size; 10 to 20 per cent may be 40 to 100 mesh; and up to 2 per cent may be finer than 100 mesh. The individual particles of the batch of particulated material to be used are coated in accordance with the invention with a suitable plastic material which is so prepared as to adhere to the particles of particulated material even when subjected to the severe washing action of a circulating drilling fluid in which the coated particles are to be suspended. In addition, as aforesaid, the nature of the plastic coating is such that it gives coherence to the particles when collected together, as in a filter cake on the walls of the well hole, but not to a significant extent while suspended in and undergoing circulation with the drilling fluid. To achieve these requisite properties, we have found certain phenol aldehyde type resins may be used on being mixed with specified catalysts which promote a regulated rate of condensation or hardening as well as the formation of a relatively stable skin over each resin coated particle before the coating hardens. The skin prevents the circulation fluid from removing the coating from the particles and also prevents premature coalescence of the resin coated particles during suspension and circulation with the drilling fluid yet permits coalescence and cohesion of the particles on being strained out of the drilling fluid, as when the drilling fluid passes into a thief zone and leaves the coated particles behind as a cake on the face of the formation. The particles in the filter cake are thus deposited and embedded in a mass of coalesced resinous material which soon hardens after coalescence into a stiff impervious body having a monolithic structure which prevents loss of fluid from the well hole into the formation. In addition to the coated filler particles, the circulation fluid may also contain uncoated filler particles as these become embedded in the filter cake and reinforce it.

The resinous liquid coating material is prepared by mixing together a first liquid, comprising the resinous partial condensation product of an aldehyde and an alkylated phenol, with an equal volume of a second liquid, comprising the resinous partial condensation product of an aldehyde, a phenol, and a polyhydroxybenzene selected from the group consisting of phloroglucinol and resorcinol and adding to the mixture special catalyst as will be later described. It is desirable to prepare a stock of the first and second liquids for use when required because the individual liquid partial condensation products can be kept for considerable lengths of time without hardening while the mixtures made from them tend to harden relatively rapidly and can be kept liquid usually for only about as long as necessary to permit use for the intended purpose.

The first of the two liquid partial condensation products, briefly described above, is formed by partially condensing an alkylated phenol with an aldehyde in the presence of an alkaline catalyst, the temperature and duration of the condensation being controlled and limited so as to avoid over condensation. The partially condensed aqueous phenolic liquid is then treated with an acid, thereby obtaining a stabilized slightly acid partially condensed resinous aqueous liquid having a moderate viscosity. This liquid is termed for convenience the first liquid.

The following example is illustrative of this procedure:

600 pounds of commercial cresylic acid, 500 pounds of paraformaldehyde and 25 pounds of aqueous caustic soda solution containing 50 per cent of sodium hydroxide by weight are mixed together in a reaction vessel provided with cooling means and the mixture allowed to react while maintaining the temperature at about 130° F. for about 30 minutes or until the paraformaldehyde has dissolved. The partially condensed liquid resinous mass thus obtained is then stabilized against further substantial change by treating it with enough hydrochloric acid to reduce the pH value of the mass to between about 3.5 and 6, a value of about 4 being preferred. This can be accomplished by mixing with it about 3.2 gallons of a 32 per cent aqueous solution of hydrochloric acid. The partially condensed resinous liquid mass is allowed to settle, whereupon a small proportion of aqueous sodium chloride solution separates from the resinous product and settles to the bottom. This is discarded. The amount discarded is about 4 gallons per 100 gallons of the separated resinous liquid product. The partially condensed resinous acidified liquid product thus obtained has a viscosity of about 400 centipoises and its specific gravity is 1.18. It can be kept in stock for as long as 6 to 8 weeks at room temperature before use, if desired. This partially condensed alkylated phenolic aldehyde resinous liquid contains about 3 moles of aldehyde (—CHO) per mole of phenol.

The second of the two liquid partial condensation products referred to above is prepared by partially condensing phenol and formaldehyde in the presence of an alkaline catalyst in aqueous solution at a controlled temperature. After partial condensation, the reaction mass is slightly acidified and allowed to settle whereby two liquid layers are obtained. These are separated by decantation, or otherwise, the upper layer consisting largely of water is rejected. The lower layer is an aqueous resinous liquid consisting essentially of partially condensed phenol-formaldehyde resin. This reaction product is cooled to room temperature and mixed with resorcinol which dissolves in it forming a liquid resinous solution termed for convenience the second liquid. It has a viscosity somewhat less than the first liquid.

The following example is illustrative of this procedure:

390 pounds of phenol, 506 pounds of 40 per cent (by volume or 37 per cent by weight) aqueous formaldehyde solution, and 50 pounds of a 50 per cent (by weight) solution of caustic soda in water are mixed together in a reaction vessel. These mixed materials are maintained at about 175° F. for about two and one-half hours following which the aqueous reaction mass is acidified to a pH between about 4 and 6, a pH of 4 being preferable. This usually requires about 6.4 gallons of 32 per cent hydrochloric acid. As the acid is added, the mixture separates into two layers, the upper layer constituting about 38 per cent of the total volume is largely salt water, and, after cooling to room temperature, is separated and discarded. The lower layer has a volume about 62 per cent of the original total volume and comprises a slightly acid partially condensed aqueous phenol-formaldehyde resin. To this added about 410 pounds of resorcinol which is stirred into it and thereby dissolved forming an aqueous partially condensed phenol-formaldehyde-polyhydroxy benzene resinous solution termed the second liquid. It has a viscosity of about 150 centipoises and its specific gravity is 1.23. It can be kept in stock at room temperature for as long as 6 to 8 weeks before use, if desired. The molecular ratios of the constituents are about 1.11 moles of phenol and 1.665 moles of formaldehyde per mole of resorcinol.

Having prepared stocks of each of the two partially condensed resinous liquids, respectively, equal volumes of each are drawn upon in sufficient amount and mixed together to prepare the desired quantity of liquid coating mixture for the contemplated well drilling operation.

The amount liquid coating mixture required varies with the amount and size of the filler particles to be used as well as their smoothness and porosity. The amount required may range, for example, from as little as 1 gallon per 100 pounds of the filler particles to as much as 10 gallons. In any event, it is desirable to completely drench each filler particle with sufficient of the liquid coating mixture to cement the particles together when the mixture hardens.

The mixing of the first and second partially condensed resinous liquids, as by stirring them together, to form the aforesaid liquid coating mixture, is performed just prior to the time the filler particles are to be coated and introduced into the circulation fluid. In most cases, also especially for low temperature wells, a suitable amount of catalyst is added to promote the desired degree of rapidity of hardening. Such mixing is most conveniently carried out in a mixer of the type used for mixing concrete in which the filler particles are tumbled and rolled on each other in the presence of the coating liquid. At the same time, the hardening catalyst also may be added and mixed in with the coating liquid. As the hardening catalyst, an aqueous alkaline solution may be used, such as caustic soda dissolved in water in a concentration of from about 5 to 25 per cent by weight.

The rate at which the liquid coating mixture thus prepared sets or becomes sufficiently hard to act as a coating and cementing material depends not only upon the proportions of the phenolic and aldehyde constituents in the two partially condensed resinous liquids, i. e. the first and second liquids, but also on the amount and concentration of catalyzing solution used in the coating mixture. In table I, the time required to bring about hardening of the coating mixture, when maintaining at 100° F., is given for various compositions of the first and second partially condensed resinous liquids, equal volumes of each being used in the coating mixture and a fixed amount of catalyst added to each mixture, viz. 0.5 c. c. of 25 per cent aqueous caustic soda solution per 50 grams of the coating mixture. The compositions of the first and second partially condensed resinous liquids are expressed in moles. In the case of the first liquid, which, as aforesaid in these examples, is composed of cresylic acid and paraformaldehyde, the cresylic acid is treated as having the formula of a cresol and the paraformaldehyde, the formula 3(HCHO), in computing the number of moles of each constituent so that one mole of paraformaldehyde is equivalent stoichiometrically to three moles of formaldehyde. In determining the setting time, as shown in Table I, the weight of coating mixture tested in each case was 50 grams.

TABLE I

*Coating mixture composition v. hardening time*

| Composition of Partially Condensed Resinous Liquids | | Hardening Time of Coating Mixture Formed of Equal Volumes of First and Second Liquids—Hours at 100° F. to harden coating mixture catalyzed with 0.5 cc. of 25% NaOH solution per 50 grams of coating mixture |
|---|---|---|
| First Liquid—Number of moles of HCHO calculated from paraformaldehyde as (HCHO)$_3$, per mole of cresylic acid calculated as a cresol | Second Liquid—Number of moles of resorcinol per 1.11 moles of phenol and 1.665 moles of formaldehyde | |
| 2.25 | 0.75 | 2.75 |
| 3 | 0.75 | 2.75 |
| 4.5 | 0.75 | 1.75 |
| 2.25 | 1.0 | 2.75 |
| 3 | 1.0 | 2.75 |
| 4.5 | 1.0 | 1.75 |
| 2.25 | 1.5 | 2.75 |
| 3 | 1.5 | 2.75 |
| 4.5 | 1.5 | 0.25 |
| 2.25 | 2.0 | 2.5 |
| 3 | 2.0 | 2.5 |

The coating mixtures thus obtained have a moderate viscosity and are generally heavier than water. For example, a coating mixture formed from a unit volume of first liquid composed of 3 moles of HCHO, derived from paraformaldehyde, per mole of cresol, and a unit volume of second liquid composed of 1 mole of resorcinol per 1.11 moles of phenol and 1.665 moles of formaldehyde, has a viscosity of 335 centipoises at 85° F. and its specific gravity is 1.205.

Although Table I gives examples of coating mixtures which spontaneously harden when maintained at 100° F. using a fixed amount of catalyst in the mixture, either faster rates of setting for the same temperature or setting at lower temperatures at the same rate can be obtained by increasing the amount of alkaline catalyst added to the coating mixture. For example, when the ratio of the number of moles of cresol to the number of moles of HCHO in the paraformaldehyde of the first liquid is about 1:1 while in the second liquid 1 mole of resorcinol is used per 1.11 moles of phenol and 1.665 moles of HCHO, the setting time of the coating mixture formed by mixing the two partially condensed liquids together varies with the amount, if any, of catalyst (5% or 25% NaOH solution) in the coating mixture. Similarly, for a given setting time, the setting temperature varies with the proportions of catalyst, if any is used. The data in Table II gives a number of illustrative examples of this.

In determining the setting time, 2.5 gallons of the first liquid partial condensation product was mixed with 2.5 gallons of the second liquid partial condensation product to which had previously been added the specified amount of catalyst and the mixture introduced into a length of 7-inch I. D. iron pipe surrounded by a water jacket maintained at the aforesaid temperature of 100° F.

TABLE II

| No. | Composition | | Setting times, hours | | | |
|---|---|---|---|---|---|---|
| | Volume of coating mixture (less volume of catalyst solution) | Volume of catalyst solution | 0.5 | 1 | 2 | 3 |
| | | | Corresponding coating mixture temperatures, ° F. | | | |
| | *Gallons* | *Gallons* | | | | |
| 1 | 9.9 | [1] 0.1 | 124 | 101 | 78 | 65 |
| 2 | 9.8 | [2] 0.25 | 138 | 115 | 92 | 79 |
| 3 | 9.9 | [2] 0.125 | 146 | 124 | 101 | 87 |
| 4 | 10.0 | [2] 0.05 | 156 | 134 | 112 | 98 |
| 5 | 10.0 | none | 176 | 153 | 129 | 116 |

[1] Catalyst: 25% solution of caustic soda in water.
[2] Catalyst: 5% solution of caustic soda in water.

In general, in the preparation of the first liquid partial condensation product, the preferred alkylated phenol to use is a cresol or a mixture of them, such as cresylic acid. Other alkylated phenols may be used in similar manner. If desired, phenol itself may be substituted for a part of the alkylated phenol in the first liquid and a part of the paraformaldehyde can be replaced by formaldehyde, the amount of HCHO being not less than about 2.25 moles per mole of alkylated phenol calculated as cresol. In the second liquid, the use of dihydroxybenzene (resorcinol), as described, gives the best results. The substitution of phloroglucinol (1,3,5-trihydoxybenzene) for resorcinol reduces the amount of sodium hydroxide catalyst required. On the other hand, resorcinol is more soluble in the phenol-formaldehyde resinous liquid than the other polyhydroxybenzenes and is generally preferred. The amount of polyhydroxybenzene used is preferably not less than about 0.67 mole per mole of phenol and the amount of formaldehyde about 1.5 moles per mole of phenol.

As aforesaid, in addition to the alkali catalyst which promotes hardening of the coating mixture, another catalyst is also used which promotes the formation in the outer layer of the coating over the filler particles of a relatively tough protective skin. Catalysts for this purpose are various amines among which the following are illustrative: phenylethanolamine, di-2-ethyl hexylamine, octylamine, hexylamine, heptylamine, and di-isoamylamine. After the alkali hardening catalyst has been incorporated in the coating resin and the coating resin has been applied to the filler particles, then the skin-forming catalyst is added. The addition of the skin-forming catalyst can be made in the same mixer in which the coating mixture is applied to the filler particles as a continuation of that mixing operation.

In the following Table III, examples are given of mixing the alkali catalyst (25 per cent aqueous sodium hydroxide solution) with the coating mixture and coating particulated coke, as the filler, with the resulting mixture followed by applying a skin-forming catalyst, e. g. phenylethanolamine, to the coated filler particles, the amounts of the two catalysts being adjusted to suit the temperature at which the coated filler particles may be used.

TABLE III

| Catalyst volume in quarts [1] | | Temperature, °F., of the ambient atmosphere |
|---|---|---|
| 25% NaOH solution | Phenylethanolamine | |
| 0.50 | 1.00 | up to 80 |
| 0.37 | 0.75 | 80-95 |
| 0.25 | 0.50 | over 95 |

[1] Per 10 gallons of coating mixture formed of 5 gallons of the example of the first partially condensed resinous liquid and 5 gallons of the example of the second partially condensed resinous liquid.

As a further illustration of the practice of the invention, the following examples are cited.

EXAMPLE A 500 pounds of coke particles, the largest dimension of which range from ⅜ inch to that permitting passage through a standard number 10 sieve, are tumbled in a concrete type mixer with 8.3 gallons of the coating mixture obtained by mixing equal volume of the first and second resinous liquids prepared as described in the examples of the making of the said first and second liquids. The coating mixture, before mixing with the coke particles, has incorporated therein 0.31 quart of 25 per cent sodium hydroxide as a hardening catalyst. Mixing is continued for a few minutes until the coke particles are completely coated with the coating mixture containing the sodium hydroxide catalyst. Then 0.63 quart of phenyl ethanolamine, as a skin-forming catalyst, is put into the mixer and mixing is continued a few minutes longer when there develops an extremely viscous and fairly tough skin on the surface of the coating on the resulting coated filler particles. The skin-toughened coated filler particles are then introduced into and mixed with 1000 gallons of drilling mud containing 500 pounds of fine uncoated coke particles (i. e. coke particles all passing through a number 10 standard sieve). The resulting mixture is then introduced into the well penetrating a thief sand, as by introducing the mixture into the circulation mud which is being pumped into the well.

As the skin-toughened coated filler particles reach the thief sand, they are filtered out forming a cake which bridges over the thief zone and after 8 to 12 hours the coating material sets hard and bonds the filler particles into an impervious monolithic structure.

EXAMPLE B

A well is losing drilling mud into a thief formation. The atmospheric temperature is 78° F. A batch of drilling mud is prepared by mixing 300 pounds of fine uncoated coke particles uniformly with 1000 gallons of drilling mud. 300 pounds of coarse coke particles, the size of which range from ⅜ inch to that permitting passage through a standard number 10 sieve are loaded into a concrete type mixer along with 5 gallons of the coating mixture prepared from the aforementioned liquid resins. The coating mixture before being added to the mixer has incorporated in it 0.25 quart of 25 per cent sodium hydroxide solution as a hardening catalyst. The coarse coke particles are tumbled in the mixer with the coating mixture for 10 minutes, whereby the coke particles become completely coated with the coating mixture containing the sodium hydroxide catalyst. Thereafter 0.5 quart of phenyl ethanolamine as a skin former is put into the mixer and the mixing continued for 5 more minutes. As a result, the coating mixture becomes very viscous and a rather tough skin forms on the surface of the coating on the filler particles. The skin-toughened coated filler coke particles thus obtained are then rapidly mixed with and dispersed in the 1000 gallons of drilling mud containing the 300 pounds of the fine uncoated coke particles. The resulting dispersion of coated and uncoated particles in the drilling mud is then introduced into the well followed by the regular drilling mud which is being pumped into the well. As the mud containing the coated fillers penetrates the thief zone, the fillers are filtered out forming a filter cake containing both coated and uncoated filler particles. The cake bridges over the thief zone and thus prevents further loss of drilling mud into this zone. After 8 to 12 hours, the coating material sets hard and bonds the fillers in place into an impermeable structure which withstands great hydraulic pressure.

We claim:

The method of controlling loss of circulation fluid from a well hole into a thief zone which comprises introducing into the circulation fluid particulated solids having a coating thereon of a resinous liquid of a partially condensed mixture of a phenol and an aldehyde and containing an alkali catalyst capable of promoting further condensation of the resinous liquid into a hard resin, said coating containing in its surface a condensation promoting agent of an amine selected from the group consisting of phenylethanolamine, di-2-ethylhexylamine, octylamine, hexylamine, heptylamine, and di-isoamylamine.

PAUL H. CARDWELL.
FRANK H. BRAUNLICH, Jr.

References Cited in the file of this patent

UNITED STATES PATENTS

| Number | Name | Date |
|---|---|---|
| 2,352,468 | Burnam | June 27, 1944 |
| 2,366,078 | Williams | Dec. 26, 1944 |
| 2,379,516 | Garrison | July 3, 1945 |
| 2,573,690 | Cardwell et al. | Nov. 6, 1951 |